United States Patent

[11] 3,587,086

[72] Inventor Andre Edouard Joseph Chatelon Montrouge, France
[21] Appl. No. 620,521
[22] Filed Mar. 3, 1967
[45] Patented June 22, 1971
[73] Assignee International Standard Electric Corporation New York, N.Y.
[32] Priority Mar. 15, 1966
[33] France
[31] 53391

[54] CODE TRANSLATOR CONTROLLED BY THE MOST SIGNIFICANT DIGIT OF A CODE GROUP
8 Claims, 2 Drawing Figs.

[52] U.S. Cl. .................................................. 340/347, 179/15
[51] Int. Cl. .................................................. G06f 5/00, H04l 3/00, H03k 13/24
[50] Field of Search .................................................. 340/347; 235/154, 155; 179/15 BS, 15 BY; 178/69.5; 325/38

[56] References Cited

UNITED STATES PATENTS

| | | | |
|---|---|---|---|
| 2,941,719 | 6/1960 | Gloess et al. .................. | 340/347 X |
| 2,957,947 | 10/1960 | Bowers ........................ | 325/38 X |
| 2,972,137 | 2/1961 | Dunn ........................... | 340/347 |
| 3,349,177 | 10/1967 | Cattermole .................. | 325/38 X |
| 3,423,534 | 1/1969 | Pan ............................. | 179/15 |
| 2,685,084 | 7/1954 | Lippel et al. ................. | 340/347 |
| 3,300,774 | 1/1967 | Chatelon et al. .............. | 340/347 |

*Primary Examiner*—Maynard R. Wilbur
*Assistant Examiner*—Michael K. Wolensky
*Attorneys*—C. Cornell Remsen, Jr., Rayson P. Morris, Percy P. Lantzy, Philip M. Bolton and Isidore Togut

ABSTRACT: Logic circuitry operating under control of timing signals increases the average number of "1" in a code group representing analog amplitudes equal to or higher than $2^{n-1}$, where *n* is equal to the number of digits in a code group, to improve synchronization derived from the "1"s of the code groups received. The condition of the most significant digit is detected; and if it is "1," the remainder of the digits are complemented, while if it is "0," the remainder of the digits are not changed. In both cases, the condition of the most significant digit is not changed to enable the use of the instant circuitry to recover the original code groups.

PATENTED JUN 22 1971 3,587,086

Inventor
ANDRÉ E. J. CHATELON
By Alfred C. Hill
Agent

CODE TRANSLATOR CONTROLLED BY THE MOST SIGNIFICANT DIGIT OF A CODE GROUP

BACKGROUND OF THE INVENTION

This invention relates to pulse code modulation (PCM) transmission systems and more particularly to a code translator for use therein.

In PCM transmission, the pieces of information are transmitted in time sequence in the form of numbers expressed in binary code. A time interval or digit time slot is reserved for the transmission of each of the digits of the binary number. Generally, the binary condition "1" is in the form of a pulse of energy, while the binary condition "0" is in the form of no energy.

To achieve transmission, the digit time slots of a code group are generated by a very high stability clock. In the propagation through a transmission medium the binary "1" pulses are submitted to amplitude attenuation and to phase disturbances. Both at the receiver exchange and intermediate regenerative repeaters in the transmission system, it is desired to employ a sample local clock unit which is synchronized by the number of binary "1" conditions present in the received signal.

Thus, in a regenerative repeater and a receiver terminal the binary "1" pulses are reshaped in form and phased to the proper time positions as defined by the recovered synchronization signals. One of the methods for obtaining these synchronization signals is by applying the regenerated signals to an oscillating circuit tuned to the repetition frequency of the digit time slots which supplies, by filtering, an oscillation at the average repetition frequency of the operation of the transmission system, and more particularly at the average repetition frequency of the occurrence of binary "1" appearing in the received signal.

It will be immediately recognized that the amplitude and the phase of the synchronizing signals will vary with the number and spacing of the binary "1" signals. Assume a received message wherein each code group includes $n$ binary digits equal to 7. The transmission of the number or code 1111111 repeated indefinitely does not supply the same synchronization signal as the repeated transmission of the code 1000000. It is known in particular that the amplitude of the synchronizing signal is approximately proportional to the average number of binary "1" pulses.

In one form of PCM system, where $n$=7 digits to code the samples of a speech signal to be transmitted, the binary level corresponding to the absence of the speech signal is $2^{n-1}=2^6=$ 64 which is represented by a code comprising a "1" in the most significant digit followed by six "0"s. The binary level corresponding to the maximum negative amplitude is represented by a code comprising seven "0"s while the binary level corresponding to the maximum positive amplitude is represented by a code comprising seven "1"s.

It has been shown statistically that the samples corresponding to the absence of speech signal or to small amplitudes of this speech signal are the most frequent, so that the average number of "1" digits will be higher when the signal samples correspond to levels lower than 64 while the average number of "1" digits will be small when the signal samples correspond to levels equal to or higher than 64.

SUMMARY OF THE INVENTION

An object of the present invention is to provide a code translator to improve the stability of the synchronization signal when this signal is generated from the "1" digits of the received signals.

Another object of the present invention is to provide a translator enabling the increase in the average number of "1" digits for the samples of the analog signal corresponding to levels equal to or higher than $2^{n-1}$.

A feature of this invention is the provision of a binary code group translator comprising a source of binary code groups; an output means; first means coupled to the source to detect the binary condition of the most significant digit of each code group; second means coupled to the source, the first means, and the output means to provide at the output means the complement of all the digits of the code group except the most significant digit when the first means detects a binary "1" condition for the most significant digit; and third means coupled to the source, the second means, and the output means to provide the most significant digit having the binary "1" condition unchanged at the output means and to provide all the digits of a code group unchanged at the output means when the first means detects a binary "0" condition for the most significant digit.

BRIEF DESCRIPTION OF THE DRAWING

The above mentioned and other features and objects of this invention will become more apparent by reference to the following description taken in conjunction with the accompanying drawings, in which.

DESCRIPTION OF THE PREFERRED EMBODIMENT

Figure 1:
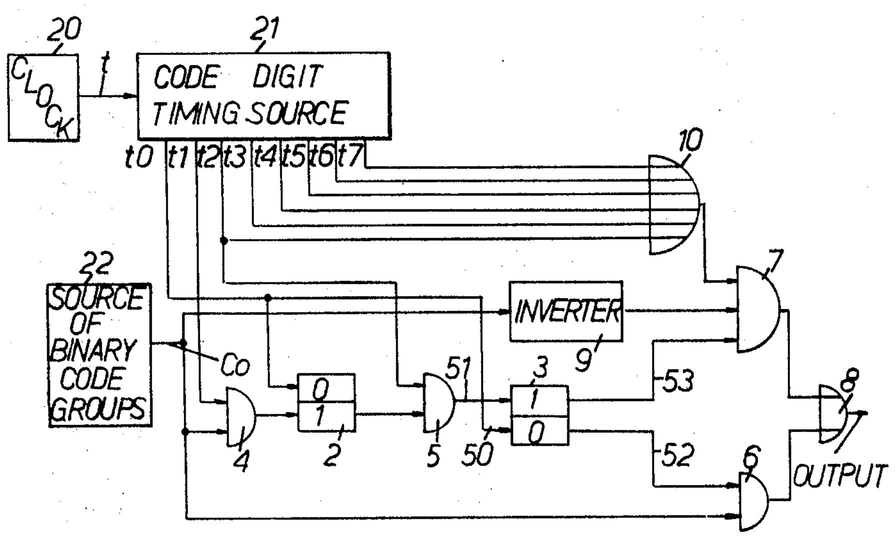
FIG. 1 is a block diagram of a code translator in accordance with the principles of this invention.
Figure 2:
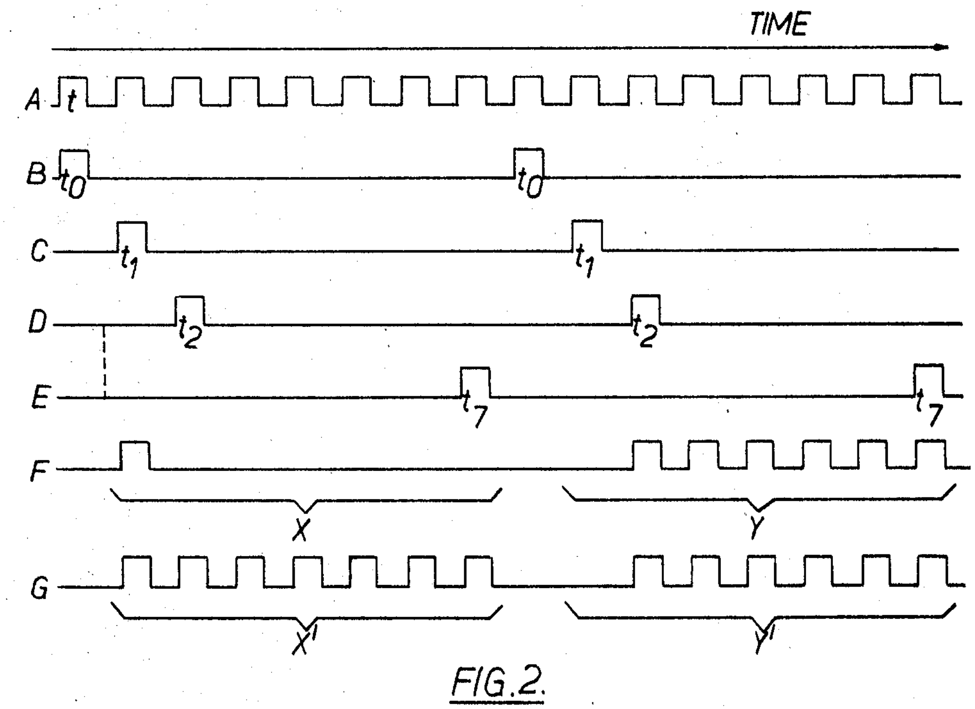
FIG. 2 is a timing diagram useful in explaining the operation of the translator of FIG. 1.

Referring to FIGS. 1 and 2, the clock signals of Curve A FIG. 2 are supplied by a very high stability clock 20 located in the transmitter terminal which operate to define the basic time slots reserved to the digits of a code group and an additional signal defining a guard time between adjacent code groups. The output of clock 20 is coupled to timing source 21 to produce from the pulses of curve A, FIG. 2 the cyclic timing signals $t_0$ to $t_7$ which appear during one clock signal out of eight. The timing signals $t_0$, $t_1$, $t_2$ and $t_7$ are illustrated in Curves B, C, D, E, FIG. 2. The code groups $C_0$ from sources 22 include $n$=7 digits for example, which are transmitted in synchronism with the timing signals $t_1$ and $t_7$. The most significant digit of the code groups is transmitted at time $t_1$.

The timing signal $t_0$ sets bistable or flip-flop circuits 2 and 3 in their "0" state. At the time $t_1$, the first digit of the code to be transmitted appears at the output of source 22 which as pointed out hereinabove is the most significant digit. For purposes of explanation it is assumed that the code to be transmitted is the code X (Curve F FIG. 2), corresponding to level 64 where the first digit is a "1" and the following digits are "0." At time $t_1$, AND circuit 4 is rendered conductive and produces an output which is coupled to the "1" input of flip-flop 2 causing flip-flop 2 to switch to its "1" state and producing a "1" at the "1" output of flip-flop 2. This output from flip-flop 2 is applied as one input to AND circuit 5.

Still at time $t_1$, the "1" condition of the most significant digit is coupled to AND circuit 6 which is rendered conductive since flip-flop 3 produces a "1" output on its "0" output lead 52. Thus, the most significant digit which is in binary condition "1" is coupled to OR circuit 8 and supplied at the output thereof.

At time $t_2$, AND circuit 5 is rendered conductive producing a "1" on lead 51 which is applied to the "1" input of flip-flop 3. This output of circuit 5 acts to switch flip-flop 3 to its "1" condition. This switching of flip-flop 3 provides a "0" condition on lead 52 and thus renders AND circuit 6 nonconductive. Due to this switching of flip-flop 3, a "1" condition appears on conductor 53 which primes AND gate 7. Inverter 9 coupled to the output of source 22 also provides a "1" output to further prime AND circuit 7. The timing pulses $t_2$—$t_7$ from source 21 are applied through OR circuit 10 to render AND circuit 7 conductive during the appropriate timing signals. In this manner the remainder of digits, after the most significant digit of code X, which are "0," are transformed into "1" resulting in the complemented code group X′ (Curve G, FIG. 2) at the output of OR gate 8.

In the operation of the circuit above-described the switching time of flip-flops 2 and 3 have been neglected.

Furthermore, the signals at the output of OR circuit 8 are not applied directly to the transmission line or other transmission media but are reshaped or transformed into bipolar pulses in a circuit where they are adjusted once again both in position and duration.

Another code group to be transmitted corresponds to a level lower than 64, for instance 63, which has a code 0111111 as illustrated by code group Y in Curve F FIG. 2. As before, flip-flops 2 and 3 are set to their "0" condition by the additional signal $t_0$. At time $t_1$, since the most significant digit of code group Y is "0," AND circuit 4 will remain in its nonconducting condition while AND gate 6 will be in a conductive condition due to the "1" output from flip-flop 3 on conductor 52. Thus, the "0" condition of the code group Y will appear at the output of OR gate 8.

Since AND gate 4 was maintained nonconductive at time $t_1$, no input was applied therefrom to flip-flop 2 which thus is maintained in its "0" condition. This results in no output at time $t_2$ from flip-flop 2 to AND circuit 5 and thus, no output on conductor 51 thereby maintaining flip-flop 3 in its "0" condition. From time $t_2$—$t_7$, conductor 53 will have a "0" condition thereon which will maintain AND circuit 7 nonconductive while conductor 52 will have a "1" condition thereon which will maintain AND circuit 6 conductive permitting passage of the remainder of the digits to the output of the translator through OR gate 8. It will be noted from Curve G, FIG. 2 that the code group Y′ in the output of OR circuit 8 is identical to the code group input from source 22 and, thus the translator has left the input code group unchanged since the most significant digit was detected to be in a "0" condition.

In summary, when the most significant digit of a code group is "1," that is when the coding level to which the code group corresponds is equal to or higher than $2^{n-1}$, all the other digits of the code group are inverted or complemented with the most significant digit being transmitted without change. On the other hand, when the most significant digit is "0," that is when the coding level to which the code group corresponds is lower than $2^{n-1}$, all the digits of the code group are transmitted without change. By this translation of code groups, it is possible to obtain for the statistically most frequent codes, that is the codes which are close to $2^{n-1}$, a large number of code digits in condition "1." This increases the average number of "1"s resulting in a better synchronization signal in the regenerative repeaters and receiver terminal.

The circuit of the present invention is also suitable for operation in a receiving exchange to restore the original code group. In affect, since the most significant digit of all the code groups are transmitted without change, this most significant digit may be used for controlling the inversion or noninversion of the code group received according to the criteria set forth hereinabove used during the transmission. Thus, only the codes having a "1" in the most significant digit will be inverted. Since these code groups have been inverted twice during transmission and reception they will be returned to their original form.

While I have described above the principles of my invention in connection with specific apparatus it is to be clearly understood that this description is made only by way of example and not as a limitation to the scope of my invention as set forth in the objects thereof and in the accompanying claims.

I claim:

1. A code translator for binary code groups comprising:
a first source of binary code groups;
an output means;
first means coupled to said first source to detect the binary condition of the most significant digit of each code group;
second means coupled to said first source, said first means, and said output means to provide at said output means the complement of all the digits of a code group except said most significant digit when said first means detects a binary "1" condition for said most significant digit; and
third means coupled to said first source, said second means, and said output means to provide said most significant digit having said binary "1" condition unchanged at said output means and to provide all the digits of a code group unchanged at said output means when said first means detects a binary "0" condition for said most significant digit;
said first means including
a second source providing a plurality of timing signals each time coincident with a different code digit of a code group and an additional signal occurring intermediate adjacent code groups;
first coincidence means coupled to said first source and said second source responsive to the timing signal corresponding to said most significant digit; and
first bistable means coupled to the output of said first coincidence means and said second source responsive to said additional signal.

2. A translator according to claim 1, wherein
said second means includes
second coincidence means coupled to the output of said first bistable means and said second source responsive to the timing signal corresponding to the code digit immediately succeeding said most significant digit;
second bistable means having two outputs coupled to the output of said second coincidence means and said second source responsive to said additional signal; an inverter means coupled to said first source; and
third coincidence means coupled to said inverter means, one of said outputs of said second bistable means and said second source responsive to said timing signals other than said timing signal corresponding to said most significant digit.

3. A translator according to claim 2, wherein
said third means includes
fourth coincidence means coupled to said first source and the other of said outputs of said second bistable means.

4. A translator according to claim 3, wherein said output means is coupled to said third and fourth coincidence means.

5. A code translator for binary code groups comprising:
a first source of binary code groups;
an output means;
first means coupled to said first source to detect the binary condition of the most significant digit of each code group;
second means coupled to said first source, said first means, and said output means to provide at said output means the complement of all the digits of a code group except said most significant digit when said first means detects a binary "1" condition for said most significant digit; and
third means coupled to said first source, said second means, and said output means to provide said most significant digit having said binary "1" condition unchanged at said output means and to provide all the digits of a code group unchanged at said output means when said first means detects a binary "0" condition for said most significant digit;
said first means including
a second source providing *n* timing signals each coincident with a different one of the *n* code digits and an additional signal occurring intermediate adjacent code groups;
a first AND circuit coupled to said first source and said second source responsive to the timing signal corresponding to said most significant digit; and
a first flip-flop having its "0" input coupled to said second source responsive to said additional signal and its "1" input coupled to the output of said first AND circuit.

6. A translator according to claim 5, wherein
said second means includes
a second AND circuit coupled to the "1" output of said first flip-flop and said second source responsive to the timing signal corresponding to the code digit immediately succeeding said most significant digit;
a second flip-flop having its "0" input coupled to said second source responsive to said additional signal and its "1" input coupled to the output of said second AND circuit;

an inverter means coupled to said first source; and a third AND circuit coupled to said inverter means, the "1" output of said second flip-flop and said second source responsive to said timing signals other than said timing signal corresponding to said most significant digit.

7. A translator according to claim 6, wherein said third means includes a fourth AND circuit coupled to said first source and the "0" output of said second flip-flop.

8. A translator according to claim 7, wherein said output means includes an OR circuit coupled to said third and fourth AND circuits.